United States Patent Office 2,910,346

Patented Oct. 27, 1959

2,910,346

RECOVERY OF GERMANIUM VALUES

Thomas J. Manns, Glenside, Pa., assignor to Philco Corporation, Philadelphia, Pa., a corporation of Pennsylvania No Drawing. Application June 15, 1956
Serial No. 591,534

18 Claims. (Cl. 23—23)

This invention relates to the recovery of germanium values from acid solutions, and more particularly to a process for the recovery of germanium values from solutions containing hydrofluoric acid and an oxidizing agent which have been employed to etch the surface of a germanium component of a transistor during the manufacture of such amplifying device.

The transistor is an important and relatively new amplifying device. Its main component is a piece of semi-conducting material, usually germanium. Because of its small size, and because no heater power is required, the transistor has great advantages for use in such applications as digital computers, hearing aid amplifiers, and proximity fuses, where small size and good power efficiency are effective. In one form of transistor, an electrode of indium is formed on the surface of the germanium element by electrodeposition or by the application of pressure and heat to a small amount of indium metal placed in contact with the germanium element. In order to obtain the proper contact between the germanium element and indium electrode, that portion of the surface of the germanium element with which the indium electrode is to be in contact must be completely wetted by the indium at the time the indium electrode is formed on the surface of the germanium element. Such wetting of the germanium surface with indium is accomplished by providing the germanium element with a surface which is clean, flat and smooth and free of any abrasive areas by etching the surface of the germanium element with an etching solution which generally comprises a mineral acid such as hydrofluoric acid and an oxidizing agent such as nitric acid. Since germanium is a relatively expensve material, it is extremely desirable that even that relatively small portion of metallic germanium which becomes dissolved in an etching solution during the etching thereof for the above-described purpose be recovered.

A method often employed for the recovery of germanium values from aqueous solutions containing germanium is by addition of hydrochloric acid or a water-soluble chloride to the solution to form germanium tetrachloride which is then separated from the solution by fractional distillation or other physical separation means. The germanium tetrachloride so obtained is then hydrolyzed to germanium dioxide with water. The relatively insoluble dioxide is then filtered from the resultant solution and dried, and the dry germanium dioxide is reduced at elevated temperature with hydrogen to relatively pure metallic germanium and water vapor. However, it was found that this method for effecting germanium recovery is not feasible where germanium is in an acid etching solution containing an oxidizing agent, such as nitric acid, and hydrofluoric acid.

Upon addition of chloride ion to this acid mixture, a violent reaction occurs between the chloride ion and nitric acid releasing chlorine. In addition the hydrofluoric acid seriously attacks glass which is the usual material of construction for the stills in which this recovery process is carried out. Further, the germanium exists as fluorogermanic acid which is quite stable and not readily distilled.

The principal object of the present invention is the provision of an efficient process for the recovery of germanium values from solutions containing them, wherein the extent of recovery of germanium values is significantly increased in a relatively inexpensive manner.

Another object of this invention is to provide a relatively simple and inexpensive process for the recovery of valuable germanium dissolved in an aqueous etching solution during the etching of germanium metal in the manufacture of transistors, thereby considerably reducing the cost of production of germanium transistors.

These and further objects will become more clearly apparent from a consideration of this specification and claims.

This invention relates to a process for recovering germanium values from an aqueous solution containing hydrofluoric acid, an oxidizing agent and germanium, which comprises adding sulfuric acid to said solution, evaporating a substantial portion of said solution to cause germanium values to be precipitated as germanium dioxide, and recovering said germanium dioxide.

It was found that by adding sulfuric acid to aqueous solutions containing hydrofluoric acid, an oxidizing agent and germanium values, and by evaporating a substantial portion, for example about 90% or more, of the solution, germanium in the solution is precipitated from the solution in the form of germanium dioxide. Recovery of the precipitated germanium dioxide can then be effected by subjecting the solution containing solid germanium dioxide to a mechanical separation step, as for example filtration or centrifugation. By such process, germanium values dissolved in etching solutions or the like containing hydrofluoric acid and an oxidizing agent such as nitric acid can easily be recovered in a simple, efficient and inexpensive manner. If the process is carried out according to its preferred form in which about 2 moles of concentrated sulfuric acid, for example 95% sulfuric acid, are added to such a germanium-containing solution for each mol of germanium therein, and said solution is evaporated substantially to dryness at about the boiling point of the solution at about atmospheric pressure, substantially complete recovery, for example greater than 95%, of germanium available in such solutions can be easily and inexpensively recovered in substantially pure form.

Although the process of this invention has application to germanium recovery generally, it is particularly useful in the semi-conductor industry whereby the cost of producing germanium-containing transistors may be appreciably reduced by reason of its employment in the recovery of valuable and costly germanium from etching solutions.

Germanium metal can then be obtained from the germanium dioxide produced by the process of this invention by any one of several known methods, as for example, by reduction of the germanium dioxide with hydrogen, carbon or the like.

It is believed that in aqueous solutions of hydrofluoric acid and an oxidizing agent such as nitric acid, germanium present is in the form of fluorogermanic acid. When sulfuric acid is added to such a solution, and the solution is subjected to evaporation, the more readily volatile components, such as the oxidizing agent and water, are readily vaporized leaving behind a residue of less volatile sulfuric acid and fluorogermanic acid, which latter substance apparently is substantially nonvolatile under the conditions of the process. A reaction then appears to take place between the sulfuric acid and the fluorogermanic acid, whereby volatile hydrofluoric acid is released and germanium sulfate is formed which almost immediately decomposes to germanium dioxide, a white, non-volatile, refractory substance. Regardless of theory, it is a fact that substantially pure germanium dioxide can be obtained by the process of this invention.

As stated previously, solutions employed to etch germanium metal in the production of transistors, and from which it is desirable to recover germanium values dissolved therein, are generally aqueous solutions of hydrofluoric acid and an oxidizing agent. Oxidizing agents suitable for use in such etching solutions may be selected from the group of nitric acid, bromine, inorganic peroxides, such as hydrogen peroxide, and mixtures of these oxidizing agents. The preferred oxidizing agent is nitric acid. The etching solutions may also contain one or more other materials, such as acetic acid, whose presence enhances the etching properties of the solution, but does not adversely alter the effectiveness of the etching solutions to any significant degree. Also, such solutions preferably do not contain a material which may hinder recovery of germanium values according to the process of this invention. In such aqueous etching solutions, hydrofluoric acid forms from about 1% to about 50%, by weight of the solution, and oxidizing agent from about 1% to about 65%, by weight. These solutions of hydrofluoric acid and oxidizing agent should contain not less than about 2.5% of water. A preferred solution comprises from about 20% to about 30% hydrofluoric acid and from about 50% to about 60% of oxidizing agent.

After etching the germanium component of a transistor with aqueous solutions containing hydrofluoric acid and an oxidizing agent, the solution will generally contain less than about 5%, of germanium. Although germanium values can be recovered from such an etching solution containing an extremely small amount of germanium by the process of this invention, it has been found that generally it is not economically feasible to attempt recovery of germanium from such an etching solution wherein the available germanium forms less than about 0.2% by weight of the solution. Usually, these etching solutions will contain from about 1% to about 2% germanium, and when germanium is present in such an amount substantially all of the germanium is recoverable according to this process. Of course, etching solutions containing much greater quantities of germanium, for example amounts greatly in excess of 5%, can be processed according to the method of this invention to obtain substantially complete recovery of the germanium values therein.

According to the process of this invention, sulfuric acid is added to aqueous solutions containing hydrofluoric acid, an oxidizing agent and germanium values. Either dilute or concentrated sulfuric acid may be added to the germanium-containing solutions; however, concentrated sulfuric acid is preferably employed for thereby less water need be evaporated during the evaporation step of the process, and evaporation costs are accordingly reduced. Preferably sulfuric acid having a concentration of at least 95%, by weight, sulfuric acid is employed.

It was found that the yield of germanium depends to a considerable degree on the amount of sulfuric acid employed. For example, in order to recover 95% or more of the germanium available in such solutions, at least about 2 mols of sulfuric acid (100% sulfuric acid) should be employed for each mol of germanium present in the germanium-containing solution. If a molar ratio of sulfuric acid to germanium of at least about 4:1 is employed, substantially all, for example about 99% or more, of available germanium may be recovered if the process is carried out in the preferred manner. Since amounts of sulfuric acid providing a molar ratio of less than about 0.5:1 generally fail to provide satisfactory yields of germanium, there is usually no advantage to their employment. Likewise no particular advantage is to be gained by increasing the molar ratio of sulfuric acid to germanium substantially above about 5:1, since substantially all of the germanium is recoverable by the use of a lesser amount, and those quantities of sulfuric acid representing an excess of acid merely present the problem of separating greater quantities of sulfuric acid from the germanium dioxide precipitate, either by filtration or evaporation. Accordingly, molar ratios of sulfuric acid to germanium in the range between about 0.5 and 5 may be employed to provide good yields of germanium. Preferably, from about 2 to about 4 mols of 95% sulfuric acid are employed for each mol of germanium in a germanium-containing solution.

Aqueous acid solution containing hydrofluoric acid, an oxidizing agent, and germanium values, to which sulfuric acid has been added, are then subjected to evaporation in order to precipitate germanium in the form of germanium dioxide. During evaporation the more volatile components of the solution, for example water and oxidizing agents such as nitric acid, are driven off, and non-volatile, refractory germanium dioxide precipitates from the remaining solution which consists substantially entirely of sulfuric acid, as evaporation proceeds. Excellent yields of germanium dioxide are generally obtainable if the solution is evaporated until the concentration of sulfuric acid in the solution is at least about 90%, by weight, of sulfuric acid. Of course, evaporation of a lesser quantity of the germanium-containing solution may produce a germanium dioxide precipitate which is recoverable; however, it is usually economically unfeasible to discontinue evaporation before substantially all of the germanium is precipitated in dioxide form. The precipitated germanium dioxide may be then separated from the remaining concentrated solution by known liquid-solid separation methods, for example by filtration or centrifugation, to produce a relatively pure germanium dioxide product. Preferably, substantially all of the aqueous acid solution is evaporated from the germanium dioxide precipitate, thereby leaving a relatively dry product, which represents substantially complete recovery, for example, a recovery in excess of about 95%, of available germanium values in the original germanium-containing solution.

Evaporation of aqueous solutions containing germanium values to which sulfuric acid has been added may be accomplished under atmospheric, superatmospheric or subatmospheric pressure. Somewhat elevated temperatures, for example temperatures in excess of about 50° C., and generally within the range between about 50° C. and the boiling point of the solution may be employed. Since toward the end of the evaporation step the solution is composed almost entirely of sulfuric acid, temperatures as high as about 330° C., about the boiling point of sulfuric acid, may be obtained. Preferably, evaporation is conducted at about the boiling point of the solution under about atmospheric pressure.

Although the process thus far described has been in relation to the recovery of germanium values from aqueous acid solutions, such as etching solutions, containing hydrofluoric acid and an oxidizing agent, the process of this invention can be used to obtain germanium values from similar type solutions containing germanium values derived from a different source. For example, it may be desirable to subject substantially pure germanium to a number of mechanical processing steps, as for example saw cutting or lapping. Residues from these operations contain germanium values in a degree sufficiently high to require their recovery. However, these residues also include impurities such as iron or the like. When it is desired to obtain substantially pure germanium values from these residues, the residues may be placed in aqueous solutions containing hydrofluoric acid and an oxidizing agent, such as nitric acid. Solutions for this purpose are generally similar to those employed for etching germanium. However, preferably the combined total of hydrofluoric acid and oxidizing agent present should not be more than about 69%, by weight, of the solution. The acid solution containing the germanium values is then filtered to separate any undissolved matter from the solution, and the solution is treated with sulfuric acid, preferably a small amount of concentrated sulfuric acid, and the solution is then evaporated, preferably to dryness, in the manner described in detail above.

The product obtained by my process, wherein the source of germanium is from residues of mechanical processing steps, will generally consist of germanium dioxide with a small amount of impurities which are not separated from the germanium during the process. Of course, the original hydrofluoric acid-oxidizing agent solution, in which the residues of germanium are first dissolved, may be treated with chemical reagents to remove certain undesirable metal ions prior to the addition of sulfuric acid and evaporation, in order to obtain a more pure germanium dioxide product.

The following specific examples of the process of this invention are given for the purpose of illustration only and are not to be considered as limiting the scope of the invention in any way.

*Example I*

78.2 grams of an aqueous solution containing 35 ml. of nitric acid, 15 ml. of hydrofluoric acid, 10 ml. of acetic acid, and 1.913 grams of germanium are placed in an open platinum dish and to this solution is added 5.42 grams of sulfuric acid (100% $H_2SO_4$), representing a molar ratio of sulfuric acid of germanium to about 2.11:1. After thoroughly mixing the concentrated sulfuric acid with the solution containing germanium values, the platinum dish is heated to evaporate all the solution present, and a white precipitate is formed in the platinum dish. The white precipitate, which is substantially pure germanium dioxide, weighs 2.681 grams representing a yield of 97.3% of germanium, based on germanium in the original germanium-containing solution.

*Example II*

To 78.2 grams of the etching solution of Example I containing 1.903 grams of germanium, are added 7.00 grams of sulfuric acid representing a molar ratio of sulfuric acid to germanium of 2.73:1, and the resulting solution is evaporated to dryness. 2.666 grams of germanium dioxide are recovered, representing a yield of 97.3% of available germanium.

*Example III*

To 78.2 grams of the etching solution of Example I, containing 1.90 grams of germanium, are added 8.74 grams of sulfuric acid, representing a molar ratio of sulfuric acid to germanium of about 3.4:1. The resulting solution is evaporated to dryness and approximately 2.711 grams of germanium dioxide are recovered, representing a yield of 98.9% germanium, based on available germanium.

*Example IV*

To 78.2 grams of the etching solution of Example I, containing 1.907 grams of germanium, are added 3.50 grams of sulfuric acid, representing a molar ratio of sulfuric acid to germanium of about 1.36:1. 2.447 grams of germanium dioxide are recovered upon evaporating the solution to dryness, representing a yield of about 89.1% germanium.

*Example V*

To 15 ml. of an acid mixture, composed of 75 ml. of glacial acetic acid; 75 ml. of 50% hydrofluoric acid; 125 ml. of 70% nitric acid; and 3.25 ml. of bromine, containing 0.200 gram of dissolved germanium are added 2.16 grams of sulfuric acid (100%), representing a molar ratio of sulfuric acid to germanium of 4:1, and the resulting solution is evaporated to dryness under atmospheric conditions. The recovered germanium dioxide weighs 0.277 gram representing a yield of 96.1%.

*Example VI*

To 48 ml. of a solution containing 32 ml. of 50% hydrofluoric acid; 6 ml. of 30% hydrogen peroxide; 10 ml. of water, and 0.203 gram of dissolved germanium are added 2.19 grams of sulfuric acid (100%), representing a molar ratio of sulfuric acid to germanium of 4:1, and the resulting solution is evaporated to dryness under atmospheric conditions. The recovered germanium dioxide weighs 0.251 gram representing a yield of 85.8%.

From the above examples, it is seen that if molar ratios of sulfuric acid to germanium somewhat below about 2:1 are employed, the yield of germanium rapidly decreases, whereas substantially all of the available germanium present is recoverable if molar ratios of from about 2:1 to about 4:1 are employed.

I claim:

1. A process for recovering germanium values from an aqueous solution containing the reaction products of hydrofluoric acid, germanium values and an oxidizing agent having a concentration of from about 1 to about 65% by weight of said solution, which comprises adding to said solution at least 0.5 mole of sulfuric acid per mole of germanium therein, evaporating said solution to cause germanium values in the form of germanium dioxide to be precipitated therefrom, and recovering said germanium dioxide.

2. The process of claim 1 in which a sufficient portion of said germanium-containing solution to which sulfuric acid has been added is evaporated to increase the sulfuric acid concentration of said solution to at least about 90%, by weight of solution.

3. The process of claim 1 in which said germanium-containing solution to which sulfuric acid has been added is evaporated substantially to dryness.

4. The process of claim 1 in which evaporation is conducted at a temperature of at least about 50° C.

5. The process of claim 2 in which from about 2 moles to about 4 moles of sulfuric acid are added to said germanium-containing solution per mole of germanium therein, and evaporation is conducted at a temperature of from about 50° C. to about the boiling point of the solution.

6. A process for recovering germanium values from an aqueous solution containing the reaction products of hydrofluoric acid having a concentration of from about 1 to about 50% by weight of said solution, an oxidizing agent having a concentration of from about 1 to about 65% by weight of said solution, germanium having a concentration of at least about 0.2% by weight of said solution and water having a concentration of at least about 2.5% by weight of said solution, which comprises adding to said solution from about 2 moles to about 4 moles of sulfuric acid per mole of germanium therein, evaporating said solution at a temperature from about 50° C. to about the boiling point of said solution to increase the sulfuric acid concentration of said solution to at least 90% by weight of said solution and to cause germanium values in the form of germanium dioxide to be precipitated therefrom, and recovering said germanium dioxide.

7. The process of claim 6 in which about 4 moles of sulfuric acid having a concentration of at least about 95%, by weight, of sulfuric acid, are added to the germanium-containing solution per mole of germanium therein, and said solution is evaporated substantially to dryness by being heated to about the boiling point of the solution at about atmospheric pressure.

8. The process of claim 7 in which the germanium-containing solution to which sulfuric acid is added contains from about 20% to about 30% of hydrofluoric acid, from about 50% to about 60% of an oxidizing agent, and from about 1% to about 2% of germanium.

9. A process for recovering germanium values from an aqueous solution containing the reaction products of hydrofluoric acid, germanium values and an oxidizing agent having a concentration of about 1 to about 65% by weight of said solution and selected from the group consisting of nitric acid, bromine, an inorganic peroxide and mixtures thereof, which comprises adding to said solution at least 0.5 mole of sulfuric acid per mole of germanium therein, evaporating said solution to cause germanium values in the form of germanium dioxide to be precipitated therefrom, and recovering said germanium dioxide.

10. The process of claim 9 in which a sufficient portion of said germanium-containing solution to which sulfuric acid has been added is evaporated to increase the sulfuric acid concentration of said solution to at least about 90%, by weight of solution.

11. The process of claim 9 in which said germanium-containing solution to which sulfuric acid has been added is evaporated substantially to dryness.

12. The process of claim 9 in which evaporation is conducted at a temperature of at least about 50° C.

13. The process of claim 10 in which from about 2 moles to about 4 moles of sulfuric acid are added to said germanium-containing solution per mole of germanium therein, and evaporation is conducted at a temperature of from about 50° C. to about the boiling point of the solution.

14. A process for recovering germanium values from an aqueous solution containing the reaction products of hydrofluoric acid having a concentration of from about 1 to about 50% by weight of said solution, an oxidizing agent having a concentration of from about 1% to about 65% by weight of said solution and selected from the group consisting of nitric acid, bromine, an inorganic peroxide and mixtures thereof, germanium having a concentration of at least about 0.2% by weight of said solution and water having a concentration of at least about 2.5% by weight of said solution, which comprises adding to said solution from about 2 moles to about 4 moles of sulfuric acid per mole of germanium therein, evaporating said solution at a temperature of from about 50° C. to about the boiling point of said solution to increase the sulfuric acid concentration thereof to at least 90% by weight of said solution and to cause germanium values in the form of germanium dioxide to be precipitated therefrom, and recovering said germanium dioxide.

15. The process of claim 14 in which about 4 moles of sulfuric acid having a concentration of at least about 95%, by weight, of sulfuric acid are added to the germanium-containing solution per mole of germanium therein, and said solution is evaporated substantially to dryness by being heated to about the boiling point of the solution at about atmospheric pressure.

16. The process of claim 15 in which the germanium-containing solution to which sulfuric acid is added contains from about 20% to about 30% of hydrofluoric acid, from about 50% to about 60% of an oxidizing agent, and from about 1% to about 2% of germanium.

17. The process of claim 16 in which the oxidizing agent is nitric acid.

18. The process of claim 16 in which the oxidizing agent is bromine.

References Cited in the file of this patent

Muller in "Chemical Abstracts," vol. 21, cols. 3171–2, 1927.

"Thorpe's Dictionary of Applied Chemistry," publ. by Longmans, Green and Co., New York, vol. V, 1941, p. 522.

Mellor: "Comprehensive Treatise on Inorganic and Theoretical Chemistry," vol. 7, p. 268, Longmans, Green and Co., N.Y.